Patented Apr. 12, 1932

1,853,521

UNITED STATES PATENT OFFICE

LEROY C. STEWART, OF MIDLAND, MICHIGAN, ASSIGNOR TO THE DOW CHEMICAL COMPANY, OF MIDLAND, MICHIGAN, A CORPORATION OF MICHIGAN

MAGNESIA CEMENT COMPOSITION

No Drawing.   Application filed September 4, 1928.   Serial No. 303,977.

My invention relates to plastic compositions of the type broadly described as magnesia cements, and more particularly to such compositions wherein the principal active ingredients are magnesia, magnesium sulphate and water, together with smaller amounts of certain beneficial substances which impart added strength and other desirable properties thereto.

Magnesia cements composed of magnesia, magnesium chloride and water, with or without smaller amounts of other active ingredients, and an inert filler are well known and extensively used. Such cements are most often referred to as "oxychloride" cements. Similar compositions wherein magnesium sulphate replaces the chloride, and denominated "oxysulphate" cements, are less well known, but they have been proposed by reason of certain advantages expected to accrue from the use of a less hygroscopic material than magnesium chloride. The latter has a strong attraction for moisture, consequently cements containing it absorb moisture from the air in greater or less amount depending upon humidity and other controlling factors. For many purposes the characteristic just mentioned is a disadvantage, in some cases even prohibiting the use of oxychloride cements where otherwise their properties are entirely suitable for the particular use in question. To avoid this difficulty, it has been sought to use magnesium sulphate, which is non-hygroscopic, in place of the chloride for purposes wherein the aforementioned disability of the oxychloride cement precludes its use. Such oxysulphate cements, however, when compounded with the primary ingredients magnesia, magnesium sulphate, water and filler alone, are relatively weak as compared with the oxychloride cements. Further, the oxysulphate cements suffer from the, for many purposes, even more serious defect that upon immersion in water their strength is much more severely diminished than in the case of the oxychloride cements, and upon again drying out such strength is only partially recovered, whereas in an oxychloride cement the original strength is usually fully recovered, and, in fact, may often be exceeded.

To illustrate this phenomenon more particularly, reference may be made to the accompanying Table I, which gives the wet, dry and recovered strengths, respectively, for a representative oxychloride and oxysulphate cement.

Table I

|  | Modulus of rupture—Lb./sq. in. | | |
|---|---|---|---|
|  | Wet | Dry | Recovered |
| Oxychloride | 663 | 1362 | 1500 |
| Oxysulphate | 236 | 1129 | 480 |

In the above examples the same materials were used in mixing the batches, with the exception of the magnesium salt, chloride or sulphate. It is seen that the oxychloride cement in the dry condition has somewhat higher strength than the oxysulphate cement. The wet strength of the oxychloride cement, taken upon samples thoroughly saturated with water, is roughly one half of the dry strength, and the recovered strength upon drying the wet sample appreciably exceeds the original dry strength. In the case of the oxysulphate cement, on the other hand, the wet strength, is only about one fifth of the dry strength and the recovered strength only two fifths of the original dry strength. It is clearly apparent from the foregoing that the great disparity in strength, under the conditions stated, of the simple oxysulphate as compared with the oxychloride cement more than offsets the other advantages which the former may possess. In view of the importance for certain purposes of obtaining a less hygroscopic magnesia cement than the oxychloride cements, such material being most readily supplied in an oxysulphate cement, a means of preventing, or counteracting, the loss in strength of the latter after immersion in water is greatly to be desired. It is the object of this invention to provide such means, said invention consisting of the combination of ingredients hereinafter fully described and particularly pointed out in the claims, the following description setting forth but a few of such combinations by way of illustration.

In a previous application filed March 24, 1928, Serial No. 264,575, I have disclosed the addition of certain beneficial substances, or strength promoters, in small amount to oxychloride cements, which substances have the effect of increasing the strength thereof as much as forty to fifty per cent or more. I have since discovered that these same substances have a similar beneficial effect when added to oxysulphate cements, and, in fact, the improvement in some respects is relatively much greater. Particularly has it been observed that improvement in the wet and recovered strength of as high as three hundred per cent may be attained. As a further consequence thereof the recovered strength of such oxysulphate cements can be made to approach the original dry strength, and may equal or exceed it.

Among such beneficial substances are soluble salts of copper and zinc, the phosphates, arsenates, borates, cromates, molybdates of the alkali metals and ammonia, organic acids such as acetic, citric, tartaric, and the like, and salts of such acids, as well as combinations of two or more of the above named substances. Obviously, if an acid is used instead of its salt, it will combine with the magnesia present to form the corresponding magnesium salt. It is desirable in such case that the acid be one that forms a soluble magnesium salt.

As examples of magnesium oxysulphate cement mixtures containing one or more of the aforementioned beneficial substances several such compositions are given in the following tabulation, such tabulation also including the figures for the strength of the wet, dry and recovered samples as shown by the modulus of rupture expressed in pounds per square inch. For purposes of comparison the corresponding figures of a sample without addition of a beneficial substance are also included. The several compositions were made up by mixing to a troweling consistency a dry mixture, consisting of 15 parts plastic magnesia, 10 parts silex, 73 parts sand, 2 parts asbestos, by weight, with a gaging liquid containing 100 parts of magnesium sulphate ($MgSO_4 \cdot 7H_2O$) and the quantity of added beneficial substance as shown in the table dissolved in water to form a 32° Bé. solution. In the dry mixture the active ingredient is obviously plastic magnesia, which is a specially prepared grade of calcined magnesium oxide most suitable for cement mixtures. The other ingredients act as fillers merely.

*Table II*

| | Modulus of rupture—Lb./sq. in. | | |
|---|---|---|---|
| | Wet | Dry | Recovered |
| No added substance | 236 | 1129 | 480 |
| 3 parts copper sulphate | 208 | 1304 | 612 |
| 3 parts disodium phosphate | 494 | 1332 | 1085 |
| 1 part sodium citrate | 754 | 1788 | 1204 |
| 1 part citric acid | 546 | 1238 | 1197 |
| 1 part diammonium phosphate | 225 | 1295 | 901 |
| 1 part sodium citrate and 1 part disodium phosphate | 588 | 1317 | 1138 |
| 1 part sodium citrate and 1 part sodium tartrate | 256 | 1082 | 788 |
| ½ part sodium citrate and ½ part diammonium phosphate | 688 | 1375 | 1025 |
| ½ part sodium citrate, ½ part sodium tartrate and ½ part diammonium phosphate | 662 | 1306 | 983 |

In the table the specimens marked "wet" were immersed for twenty-four hours in water on the 14th, 16th, and 18th days after making. They were then tested on the 19th day. The "recovered" specimens were treated exactly in the same way except that they were not tested until the 21st day at which time they had been allowed to dry for two days. The "dry" specimens were tested on the 20th day, to afford a fair comparison as to aging between the tests on the 19th and 21st days, respectively, of the other specimens. These tests were made in accordance with the standard procedure for testing magnesia cements.

The significance of the figures is at once apparent, and clearly demonstrates the improved strength imparted to the magnesium oxysulphate cement mixture by the addition of a relatively small amount of the beneficial substance or of a plurality of such substances. In fact, the improvement thereby attained is such as to render the use of the aforementioned oxysulphate cements commercially practicable, and constitutes an important advance in the art.

In practice it will be found that there may be a wide variation in the strength of both oxychloride and oxysulphate cements dependent upon the source from which the magnesia is obtained, the temperature at which it is calcined, and other factors. In fact, there will be some variation in mixtures containing magnesia obtained from the same lot or source. The foregoing figures given in the examples are to be regarded, therefore, as representative only of mixtures made up using a good grade of plastic magnesia, and it will be understood that such figures may not necessarily be duplicated using materials from different sources.

The beneficial substances may be added in various ways, such as (1) dissolved in the magnesium sulphate solution used for gaging the dry mixture; or (2) incorporated with the other dry ingredients of the cement mixture. The precise manner of introducing the beneficial substances is not essential for the purpose of the invention, as in practice this may be done in any convenient manner.

Other modes of applying the principle of my invention may be employed instead of the one explained, change being made as regards the materials employed, provided the ingredients stated by any of the following claims or the equivalent of such stated ingredients be employed.

I therefore particularly point out and distinctly claim as my invention:—

1. A plastic cement composition which includes as active ingredients magnesia, magnesium sulphate and water, together with a relatively small amount of a soluble citrate intimately incorporated therewith.

2. A plastic cement composition which includes as active ingredients magnesia, magnesium sulphate and water, together with a relatively small amount of sodium citrate intimately incorporated therewith.

3. A plastic cement composition which includes as active ingredients magnesia, magnesium sulphate and water, together with a relatively small amount of a soluble citrate and phosphate intimately incorporated therewith.

4. A plastic cement composition which includes as active ingredients magnesia, magnesium sulphate and water, together with a relatively small amount of a soluble citrate, tartrate and phosphate intimately incorporated therewith.

5. A cement composition consisting of the active ingredients magnesia and magnesium sulphate, together with a relatively small amount of a compound selected from the group consisting of the phosphates, citrates, and tartrates of the alkali metals and ammonia and a filler, said composition being adapted to set upon admixing with water.

6. A cement composition comprising the primary ingredients magnesia and magnesium sulphate, together with a relatively small amount of a soluble citrate and a filler, and adapted to set upon admixing with water.

7. A cement composition comprising the primary ingredients magnesia and magnesium suphate, together with a relatively small amount of sodium citrate and a filler, and adapted to set upon admixing with water.

8. An ingredient suitable for incorporating in a magnesia cement, said ingredient comprising magnesium sulphate and a relatively small amount of a soluble citrate.

9. An ingredient suitable for incorporating in a magnesia cement, said ingredient comprising magnesium sulphate and a relatively small amount of sodium citrate.

10. A cement composition consisting of a mixture of magnesia and magnesium sulphate, together with a relatively small amount of a compound selected from the group consisting of the phosphates, citrates and tartrates of the alkali metals and ammonia, said composition being adapted to set upon admixing with water.

11. A cement composition comprising a mixture of magnesia and magnesium sulphate, together with a relatively small amount of a soluble citrate, and adapted to set upon admixing with water.

12. A cement composition comprising a mixture of magnesia and magnesium sulphate, together with a relatively small amount of sodium citrate, and adapted to set upon admixing with water.

13. A gaging composition suitable for incorporating in a magnesia cement, said composition comprising magnesium sulphate and a relatively small amount of a compound selected from the group consisting of the phosphates, citrates and tartrates of the alkali metals and ammonia.

14. The process of making a plastic cement composition which includes the step of adding to a mixture consisting of magnesium oxide, magnesium sulphate and water as active ingredients, a relatively small amount of a compound selected from the group consisting of the phosphates, citrates and tartrates of the alkali metals and ammonia.

Signed by me this 15th day of August, 1928.

LEROY C. STEWART.